United States Patent [19]

Schlenker

[11] Patent Number: 5,063,809

[45] Date of Patent: Nov. 12, 1991

[54] RETURN TUBE ARRANGEMENT FOR BALL SCREW ASSEMBLY

[75] Inventor: Theodore R. Schlenker, Troy, Mich.

[73] Assignee: Dana Corporation, Toledo, Ohio

[21] Appl. No.: 597,143

[22] Filed: Oct. 15, 1990

[51] Int. Cl.$^5$ ............................................. F16H 55/17
[52] U.S. Cl. .................................................... 74/459
[58] Field of Search ............................................. 74/459

[56] References Cited

U.S. PATENT DOCUMENTS

| 476,304 | 6/1892 | Pratt | 74/459 |
|---|---|---|---|
| 2,855,791 | 10/1958 | Hogan | 74/459 |
| 3,532,004 | 10/1970 | Nilsson | 74/459 |
| 4,357,838 | 11/1982 | Blaurock et al. | 74/459 X |
| 4,677,869 | 7/1987 | Mayfield | 74/459 X |
| 4,953,419 | 9/1990 | Schlenker | 74/459 |

FOREIGN PATENT DOCUMENTS

| 2043064 | 3/1972 | Fed. Rep. of Germany | 74/459 |
|---|---|---|---|
| 1191661 | 11/1985 | U.S.S.R. | 74/459 |
| 27956 | of 1911 | United Kingdom | 74/459 |

Primary Examiner—Leslie A. Braun
Assistant Examiner—Scott Anchell
Attorney, Agent, or Firm—Dykema Gossett

[57] ABSTRACT

An improved ball screw assembly is disclosed in which a return tube has a pair of minor legs which enter into two ends of the internal helical groove within a nut to return ball bearings between the two ends. Apertures are formed within the nut such that the return tube can be mounted as a one-piece item by moving it perpendicular to the central axis of the screw into the two apertures. The apertures are formed by removing all material which would normally be radially outward of the minor legs, and would prevent mounting of the return tube by moving it perpendicular to the axis of the screw. Due to this improved arrangement between the return tube and the nut, a one-piece return tube can be utilized which contacts the end of the helical groove at an angle parallel to the helix angle and tangent to the helical groove at the ends.

16 Claims, 1 Drawing Sheet

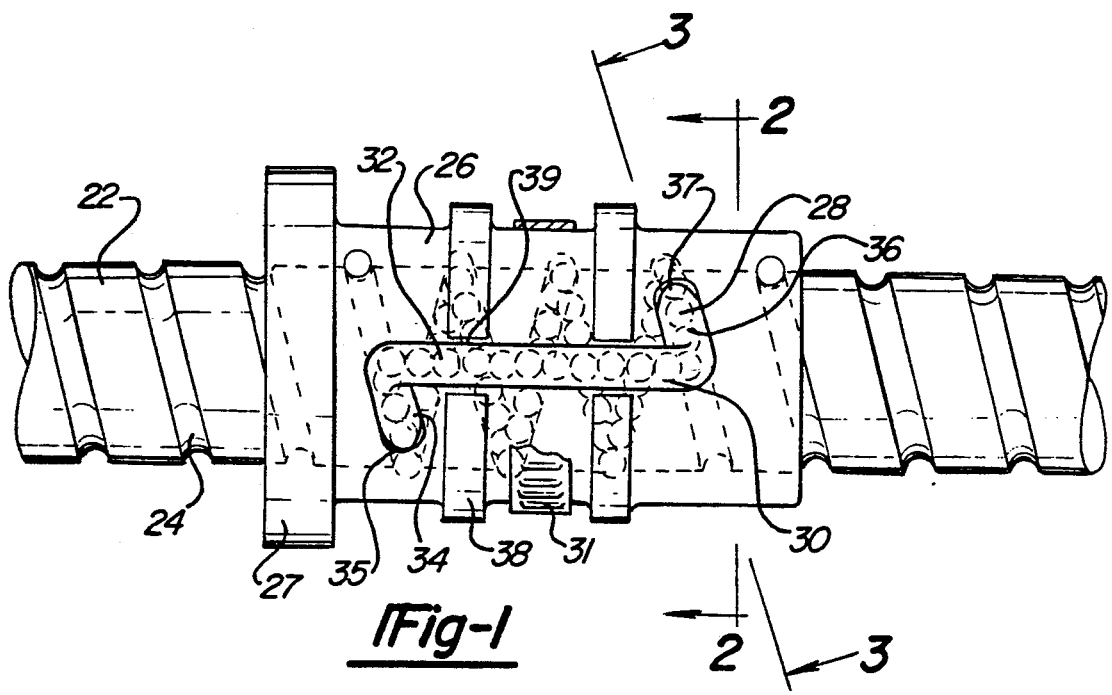
*Fig-1*
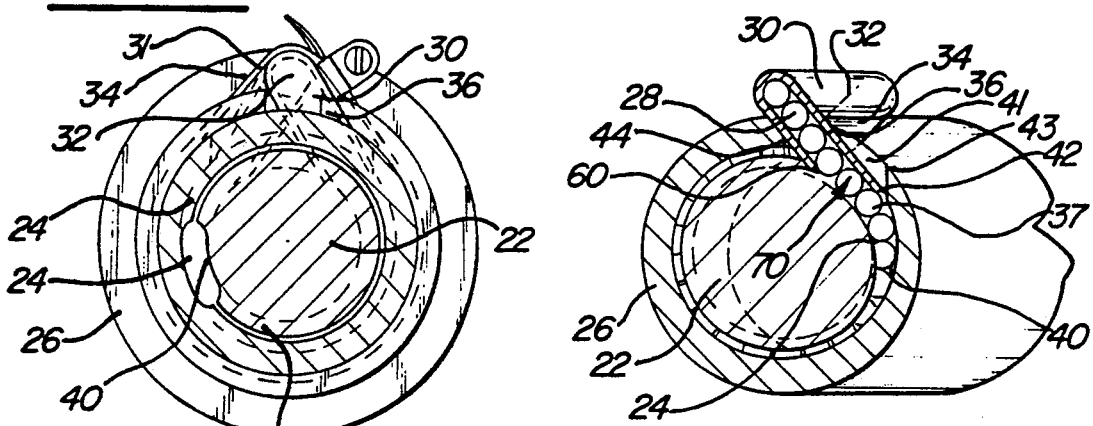
*Fig-2*  *Fig-3*
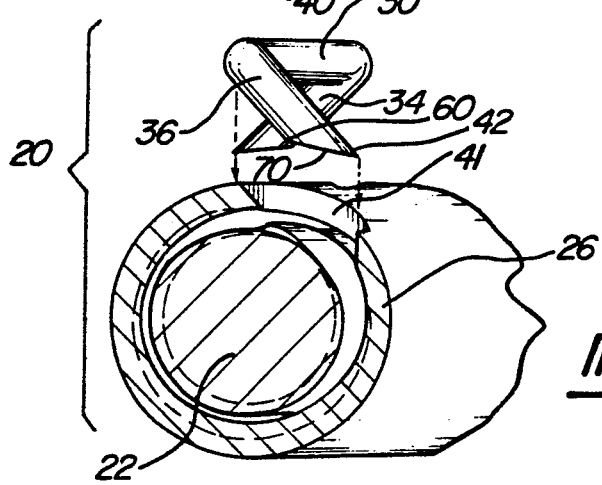
*Fig-4*

RETURN TUBE ARRANGEMENT FOR BALL SCREW ASSEMBLY

BACKGROUND OF THE INVENTION

This application relates to a return tube for use with a ball screw assembly. More particularly, the present invention discloses a relationship between the minor legs of the return tube and the apertures to receive the minor legs formed in the nut of the ball screw assembly.

Ball screw assemblies are used in several applications where extremely accurate positioning is desired. Essentially, a screw member having a groove at an external surface is received within an internal bore of a nut, wherein the internal bore has a mating internal groove extending between first and second ends. Ball bearings are received between the grooves in the screw and the nut. The screw or the nut is rotated relative to the other, and the non-rotated member moves axially relative to the rotated member. As the nut moves relative to the screw, the ball bearings move within the grooves. A return tube is positioned at one end of the internal groove within the nut and communicates balls from that end to the other end of the groove in the nut. Thus, as the member moves, the ball bearings move within the helical grooves between the nut and the screw and are returned from a first end of the internal groove in the nut to the second end through a return tube.

In many prior art ball screw assemblies, ball bearings leaving the groove were subjected to an abrupt directional change as they entered the return tube. This was inefficient and resulted in noise and heat loss from the assembly.

An improved ball screw assembly is known in which the return tube comprises a major leg extending along an axis parallel to the axis of the screw and a pair of minor legs extending at an acute angle relative to the major leg, and communicating with the first and second ends of the internal groove at an angle parallel to the helix angle, and tangent to the helical groove at the end. Since the minor leg of the return tube is tangent to the helical groove, the ball bearing does not encounter any abrupt direction change and thus exits the groove and enters the return tube without the previously encountered noise or heat losses. Essentially, the minor leg is positioned such that a ball bearing exiting the end of the internal groove continues moving in the same direction as it enters the return tube. One such device is disclosed in U.S. Pat. No. 4,953,419, issued to the inventor of the present invention.

One potential limitation on the above-disclosed device is that the return tube normally has to be formed of two pieces in order for the two minor legs to each be inserted into the apertures in the nut. The helix angles at the first and second end of the internal groove tend to be in opposite directions, and thus the minor legs extend in opposed directions. Since the two minor legs extend in opposed directions, they cannot normally each be inserted into respective apertures if the return tube is formed of a single piece.

In some applications it is desirable to have one-piece return tube. A two-piece return tube may not be as structurally sound as a one-piece return tube. Further, the use of the two-piece tube requires additional steps in assembling the ball screw assembly.

For this reason it would be desirable to have a ball screw assembly in which minor legs enter the helical groove at an angle parallel to the helix angle and tangent to the helical groove at the ends of the groove, and wherein the return tube is a one-piece item.

SUMMARY OF THE INVENTION

In a disclosed embodiment of the present invention apertures are formed in a ball screw assembly nut to receive return tube minor legs. The apertures are disclosed as being sized such that there is no nut wall material radially outside of the minor leg. Thus, the return tube may be moved into an operative position in the nut by simply moving it perpendicular to the axis of the screw. The two minor legs move into respective apertures and reach the position where they communicate with the two ends of an internal helical groove in the nut.

In a preferred embodiment of this invention the return tube is a one-piece item having a major leg extending generally parallel to the central axis of the screw, and interconnecting a pair of minor legs, each of which form an acute angle with the major leg.

In a preferred embodiment of the present invention at least one of the apertures is shaped to at least include the area that a forward end of an opening in each minor leg directly adjacent to the internal groove would pass through if it were moved outwardly, away from the nut in a direction perpendicular to the central axis of the ball screw. Alternatively, the aperture could be said to exclude that area from the nut. Most preferably, both apertures are shaped to include this area.

Further, in a most preferred embodiment the aperture adjacent the rearward end of the minor leg is ramped. The ramped surface guides and supports the minor leg.

In a method according to the present invention the aperture is first cut into the nut by drilling an initial hole such as was found in the previously ball screw assemblies along a line parallel to the helix angle, and tangent to the end of the helical groove. Once the hole is cut to reach the groove, the cutting tool is then moved radially outwardly without withdrawing it from the aperture. As the cutting tool is moved radially outwardly, it removes the material that would normally be above the aperture, thus providing the space through which the minor leg moves downwardly into the aperture. The return tube can then be moved perpendicular to the axis of the screw, with its minor legs entering the apertures as a one-piece item.

Further objects and features of the present invention can be best understood from the following specification and drawings which the following is a brief description.

BRIEF DESCRIPTION OF THE DRAWINGS

FIG. 1 is a top view of a ball screw assembly according to the present invention.

FIG. 2 is a cross-sectional view along line 2—2 as shown in FIG. 1.

FIG. 3 is a cross-sectional view along line 3—3 as shown in FIG. 1.

FIG. 4 is a cross-sectional view similar to that shown in FIG. 3 showing the movement of the return tube into the apertures.

DETAILED DESCRIPTION OF THE PREFERRED EMBODIMENTS

A disclosed embodiment of the present invention can be understood from FIGS. 1-4. FIG. 1 illustrates ball screw assembly 20 including conventional screw 22 having an external helical groove 24 and received within nut 26. Nut 26 has an internal helical groove, described below, and an actuator flange 27 at one end. A plurality of ball bearings 28 are received between external groove 24 and the internal groove within nut 26. Return tube 30 is connected to nut 26 by a standard hose clamp 31, shown in section, and includes major leg 32 extending generally parallel to a central axis of screw 22, first minor leg 34 which enters into first end 35 of the helical groove in the nut and second minor leg 36 which enters a second end 37 of the helical groove within the nut. Return tube 30 communicates balls between first end 35 and second end 37. As is commonly known, as screw 22 moves relative to nut 26 ball bearings 28 move within the grooves and eventually communicate and enter into one of minor legs 34 and 36, passed through major leg 32 and enter into other minor leg to be returned to the helical grooves.

A pair of axially spaced circumferentially extending flanges 38 extend radially outwardly from nut 26 and have slots 39 which receive and support return tube 30. Hose clamp 31 is placed between flanges 38 to retain return tube 30 in the illustrated position.

In a disclosed embodiment illustrated in FIG. 2, minor leg 36 extends at an angle relative to major leg 32 which is directly opposite to minor leg 34. Minor legs 34 and 36 each enter an end 35 and 37, respectively, at an angle parallel to the helix angle, and tangent to the helical groove at the respective end. Thus, ball bearings entering the minor legs need not pass through any abrupt direction change, but instead enter return tube 30 smoothly, with no resulting noise or heat loss. Internal groove 40 is formed at an inner periphery of nut 26 and, in combination with external groove 24, defines a helical groove to receive ball bearings 28.

FIG. 3 illustrates minor leg 36 entering first end 37 of the helical groove formed by grooves 24 and 40. As shown, aperture 41 is formed through the wall of nut 26 to receive minor leg 36. Minor leg 36 could be said to have a forwardmost end 42 which is positioned adjacent to the end 37 of the groove and an rearwardmost end 60 at a position removed from end 37 of groove 40. As shown in this embodiment, minor leg 36 has an opening end face 70 defining a plane at an acute angle with a central axis of minor leg 36. Aperture 41 is such that no wall portions from nut 26 are radially outward of minor leg 36. Due to this minor leg 36 can be moved perpendicular to the central axis of screw 22 into aperture 41. Similarly, minor leg 34 can be moved into an identical aperture 41 at first end 35. In a sense, a circumferential extent is defined between points 42 and 60 and aperture 41 extends through the wall thickness of nut 26 at least throughout that circumferential extent.

More particularly, apertures 41 are at least of a size to provide clearance such that the forwardmost point can be moved outward of the aperture in a direction perpendicular to the axis of screw 22. Aperture 41 has a wall 43 at the forward end that extends generally perpendicular to the axis of major leg 32. Further, aperture 41 has a wall 44 at the rearward end defining a ramped surface along the angle that minor leg 36 enters the aperture. Ramped surface 44 guides and supports minor leg 36 within aperture 41.

As shown in FIG. 4, the shape of apertures 41 allows return tube 30 to be moved directly perpendicular to a central axis of screw 22 into apertures 41. Leg 36 moves directly downwardly into aperture 41, while leg 34 moves into a similar aperture 41 associated with first end 35. Due to this, a one-piece return tube which is structurally stronger than previously required two-piece tubes can be utilized.

In a method of assembling a ball screw assembly 20 according to the present invention, a cutting tool first cuts an initial hole along a line parallel to the helix angle and tangent to the helical groove at ends 35 and 37. The cutting tool is then brought directly outwardly such that all the material radially outward of the initial hole is removed. Return tube 30 can then be moved into apertures 41 by simply being moved perpendicular to the central axis of screw 22. Minor legs 34 and 36 are received within apertures 41 and the return tube 30 is then secured to nut 26 by hose clamp 31.

Although a preferred method has been disclosed, certain other methods could be envisioned for constructing the inventive ball screw assembly. The invention should be seen as included all ball screw assemblies where a return tube is at an angle parallel to a helix angle and tangent to a helical groove, and wherein the shape of the return tube apertures allow the assembly of the return tube as a single piece.

Preferred embodiments of the present invention have been disclosed, however, a worker of ordinary skill in the art would recognize that certain modifications would come within the scope of this invention and thus the following claims should be studied in order to determine the true scope and content of the invention.

I claim:

1. A ball screw assembly comprising:
   an elongated screw extending along an axis and having an external helical groove;
   a nut defining a wall and having an internal bore with an internal helical groove corresponding to said external helical groove, said screw received in said internal bore;
   a plurality of ball bearings received between said internal and external grooves, said ball bearings adapted to move through said grooves from a first end of said internal helical groove to a second end of said internal helical groove, said internal helical groove defining helix angles at both said first and second ends, said nut having apertures extending through the wall at said first and second ends;
   a return tube having a minor leg received in each of said apertures, each said minor leg having a forwardmost point extending to said first and second ends of said internal groove, respectively, and having openings communicating with said ends to receive balls from one of said first and second ends, and to return said balls to the other of said first and second ends, each said leg extending at an angle parallel to said helix angle and tangent to said helical groove at a respective one of said ends; and
   at least one of said apertures being shaped to at least exclude a portion of said nut that said forwardmost point of the associated minor leg will pass through if said return tube were perpendicularly moved away from said axis.

2. A ball screw assembly as recited in claim 1, wherein said return tube is moved into said apertures as a one-piece item.

3. A ball screw assembly as recited in claim 1, wherein said return tube includes a major leg which innerconnects said two minor legs.

4. A ball screw assembly as recited in claim 3, wherein said major leg extends generally parallel to the axis of said screw.

5. A ball screw assembly as recited in claim 4, wherein said minor legs define acute angles with said major leg.

6. A ball screw assembly as recited in claim 5, wherein said return tube is a one-piece item.

7. A ball screw assembly as recited in claim 6, wherein both of said apertures are of the claimed shape.

8. A ball screw assembly as recited in claim 7, wherein each of said apertures include a ramped surface extending at the same angle as its associated minor leg, said ramped surface guiding and supporting said minor leg.

9. A ball screw assembly as recited in claim 1, wherein each of said apertures include a ramped surface extending at the same angle as its associated minor leg, said ramped surface guiding and supporting said minor leg.

10. A ball screw assembly as recited in claim 1, wherein a pair of axially spaced circumferentially extending flanges extend radially outwardly from the body of said nut and define slots to receive and support said return tube.

11. A ball screw assembly as recited in claim 10, wherein a clamp secures said return tube to said nut.

12. A ball screw assembly as recited in claim 1, wherein both of said apertures exclude a portion of said nut that said forwardmost portion of the associated minor leg will pass through if said return tube were perpendicularly moved away from said axis.

13. A ball screw assembly comprising:
an elongated screw extending along an axis and having an external helical groove;
a nut defining a wall and having an internal bore with an internal helical groove corresponding to said external helical groove, said screw received in said internal bore;
a plurality of ball bearings received between said internal and external grooves, said ball bearings adapted to move through said grooves from a first end of said internal helical groove to a second end of said internal helical groove, said internal helical groove defining helix angles at both said first and second ends, said nut having apertures extending through the wall at said first and second ends;
a return tube having a minor leg received in each of said apertures, each said minor leg having a forwardmost point extending to said first and second ends of said internal groove, respectively, and having openings communicating with said ends to receive balls from one of said first and second ends, and to return said balls to the other of said first and second ends, each said leg extending at an angle parallel to said helix angle and tangent to said helical groove at a respective one of said ends, said return tube being moved into said apertures as a one-piece item; and
said apertures being shaped to at least exclude a portion of said nut that said forwardmost point of the associated minor leg will pass through if said return tube were perpendicularly moved away from said axis, said apertures including a ramped surface at the same angle as said minor legs, said ramped surface guiding and supporting said minor leg.

14. A ball screw assembly as recited in claim 13, wherein said return tube includes a major leg which innerconnects said two minor legs.

15. A ball screw assembly as recited in claim 14, wherein said major leg extends generally parallel to the axis of said screw.

16. A ball screw assembly as recited in claim 13, wherein a pair of axially spaced circumferentially extending flanges extend radially outwardly from the body of said nut and define slots to receive and support said return tube.

* * * * *